United States Patent
Yang et al.

(10) Patent No.: US 12,025,789 B2
(45) Date of Patent: Jul. 2, 2024

(54) DISPLAY SYSTEM AND METHOD THEREOF

(71) Applicant: HIMAX TECHNOLOGIES LIMITED, Tainan (TW)

(72) Inventors: Kuan-Sheng Yang, Tainan (TW); Ming-Hung Weng, Tainan (TW); Cheng-Che Tsai, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 526 days.

(21) Appl. No.: 17/481,325

(22) Filed: Sep. 22, 2021

(65) Prior Publication Data

US 2023/0085913 A1    Mar. 23, 2023

(51) Int. Cl.
| | |
|---|---|
| *G02B 26/04* | (2006.01) |
| *G02B 27/01* | (2006.01) |
| *H04N 13/341* | (2018.01) |
| *H04N 13/398* | (2018.01) |

(52) U.S. Cl.
CPC ......... *G02B 26/04* (2013.01); *G02B 27/0172* (2013.01); *H04N 13/341* (2018.05); *H04N 13/398* (2018.05); *G02B 2027/0178* (2013.01)

(58) Field of Classification Search
None
See application file for complete search history.

(56) References Cited

U.S. PATENT DOCUMENTS

| | | | | |
|---|---|---|---|---|
| 8,441,528 | B2* | 5/2013 | Kim | H04N 13/398 |
| | | | | 348/51 |
| 9,116,360 | B2* | 8/2015 | Kim | G02B 30/24 |
| 2009/0237495 | A1* | 9/2009 | Kawahara | G09G 3/003 |
| | | | | 348/E13.001 |
| 2010/0060723 | A1* | 3/2010 | Kimura | G02B 30/24 |
| | | | | 348/56 |
| 2011/0050866 | A1* | 3/2011 | Yoo | H04N 13/341 |
| | | | | 348/E13.001 |
| 2011/0134115 | A1* | 6/2011 | Araki | H04N 13/356 |
| | | | | 345/419 |
| 2011/0199402 | A1* | 8/2011 | Ishii | G09G 3/3611 |
| | | | | 345/102 |

(Continued)

FOREIGN PATENT DOCUMENTS

| | | |
|---|---|---|
| CN | 102200645 A | 9/2011 |
| CN | 102547342 A | 7/2012 |

(Continued)

*Primary Examiner* — Fred Tzeng
(74) *Attorney, Agent, or Firm* — Winston Hsu

(57) ABSTRACT

A display system includes an image display device and a pair of shutter glasses. The image display device includes a display panel, a display communication circuit and a control circuit. The control circuit is configured to control the display communication circuit to transmit a shutter glasses control signal, and configured to control the display panel to alternately display a normal image and a compensate image according to a timing control signal. The pair of shutter glasses includes a pair of shutters, a glasses communication circuit and a shutter control circuit. The glasses communication circuit is configured to receive the shutter glasses control signal. The shutter control circuit is configured to alternately open and close the pair of shutters according to the shutter glasses control signal.

20 Claims, 13 Drawing Sheets

(56) References Cited

U.S. PATENT DOCUMENTS

| | | | |
|---|---|---|---|
| 2011/0228061 A1* | 9/2011 | Price | H04N 13/398 348/56 |
| 2011/0242089 A1* | 10/2011 | Miki | G02F 1/1395 349/13 |
| 2011/0243325 A1* | 10/2011 | Ishii | G09G 3/20 345/589 |
| 2011/0279490 A1* | 11/2011 | Lee | G09G 3/003 345/691 |
| 2012/0038690 A1* | 2/2012 | Lee | G02B 30/24 345/691 |
| 2012/0092331 A1* | 4/2012 | Ogawa | G09G 3/3406 345/419 |
| 2012/0140049 A1 | 6/2012 | Liou | |
| 2012/0242811 A1* | 9/2012 | Cho | H04N 13/341 348/54 |
| 2013/0063420 A1* | 3/2013 | Jiang | G09G 3/003 345/419 |
| 2013/0076785 A1* | 3/2013 | Chen | G09G 3/001 345/629 |
| 2013/0100113 A1* | 4/2013 | Seo | H04N 13/341 345/214 |
| 2013/0249954 A1 | 9/2013 | Chiu | |
| 2024/0029669 A1* | 1/2024 | Cai | G09G 3/32 |

FOREIGN PATENT DOCUMENTS

| | | |
|---|---|---|
| CN | 106814460 A | 6/2017 |
| CN | 109413410 A | 3/2019 |

* cited by examiner

DISPLAY SYSTEM AND METHOD THEREOF

BACKGROUND OF THE INVENTION

1. Field of the Invention

The present invention is related to a display system, and more particularly, to a display system for anti-peep mechanism.

2. Description of the Prior Art

In order to protect the privacy of personal data, current anti-peep products use anti-peep sheets attached to a screen to protect the display image through different viewing angles. Some anti-peep display products on the market achieve anti-peep function by adjusting the backlight module, to control an angle of the liquid crystal, such that a user can see an image of the screen by watching the screen at the front and other people are not able to see the image of the screen due to the viewing angle. However, the angle of visibility and light transmittance of the product determines the performance of anti-peep function, and it still cannot prevent peeping from behind the user.

SUMMARY OF THE INVENTION

It is therefore an objective of the present invention to provide a display system and a method for anti-peep mechanism, where the display system comprises an image display device and a pair of shutter glasses, such that an image on the image display device can only be watched through the pair of shutter glasses.

At least one embodiment of the present invention provides a display system. The display system comprises an image display device and a pair of shutter glasses. The image display device comprises a display panel, a display communication circuit and a control circuit. The control circuit is coupled to the display panel and the display communication circuit. The control circuit is configured to generate a timing control signal and a shutter glasses control signal, configured to control the display communication circuit to transmit the shutter glasses control signal, and configured to control the display panel to alternately display a normal image and a compensate image according to the timing control signal. The pair of shutter glasses comprises a pair of shutters, a glasses communication circuit and a shutter control circuit. The pair of shutters comprises a left-eye shutter and a right-eye shutter. The glasses communication circuit is configured to receive the shutter glasses control signal from the image display device. The shutter control circuit is configured to alternately open and close the pair of shutters according to the shutter glasses control signal. When the display panel displays the normal image, the shutter control circuit opens both of the left-eye shutter and the right-eye shutter; when the display panel displays the compensate image, the shutter control circuit closes both of the left-eye shutter and the right-eye shutter.

At least one embodiment of the present invention provides a display method. The method comprises: generating a timing control signal and a shutter glasses control signal; transmitting the shutter glasses control signal to a pair of shutter glasses, wherein the pair of shutter glasses comprises a pair of shutters, and is configured to receive the shutter glasses control signal, and the pair of shutters comprises a left-eye shutter and a right-eye shutter; controlling the display panel to alternately display a normal image and a compensate image according to the timing control signal; and controlling the pair of shutters to be alternately opened and closed according the shutter glasses control signal, comprising: when the display panel displays the normal image, opening both of the left-eye shutter and the right-eye shutter, and when the display panel displays the compensate image, closing both of the left-eye shutter and the right-eye shutter.

The present invention method and display system can control a display panel to alternately display a normal image and a compensate image according to a timing control signal. Through a pair of shutters of a pair of shutter glasses being opened and closed, only a user who wears the pair of shutter glasses may see the normal image, which prevents the personal data on the screen from being peeped at any angle and therefore achieves anti-peep mechanism.

These and other objectives of the present invention will no doubt become obvious to those of ordinary skill in the art after reading the following detailed description of the preferred embodiment that is illustrated in the various figures and drawings.

Figure 12:
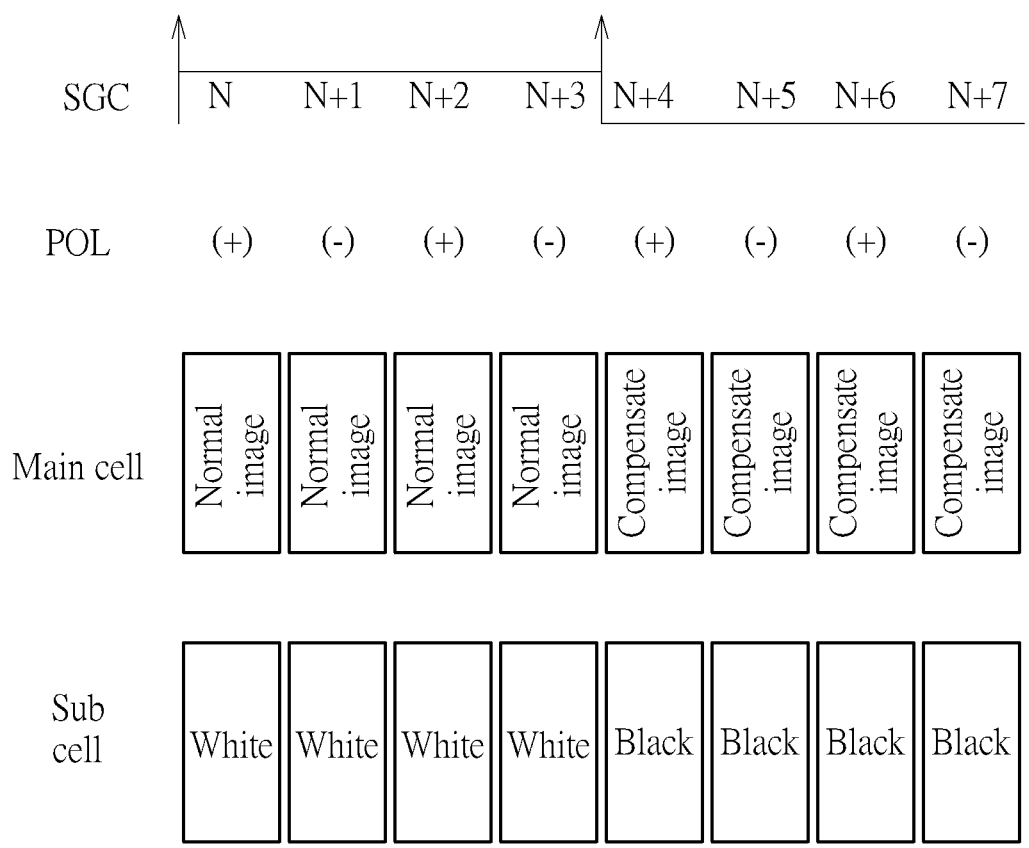

FIG. 12 is a diagram illustrating states of signals, the display panel and the back light module in a cycle with 8 frame period of the SGC signal according the second embodiment of the present invention.

Figure 13:
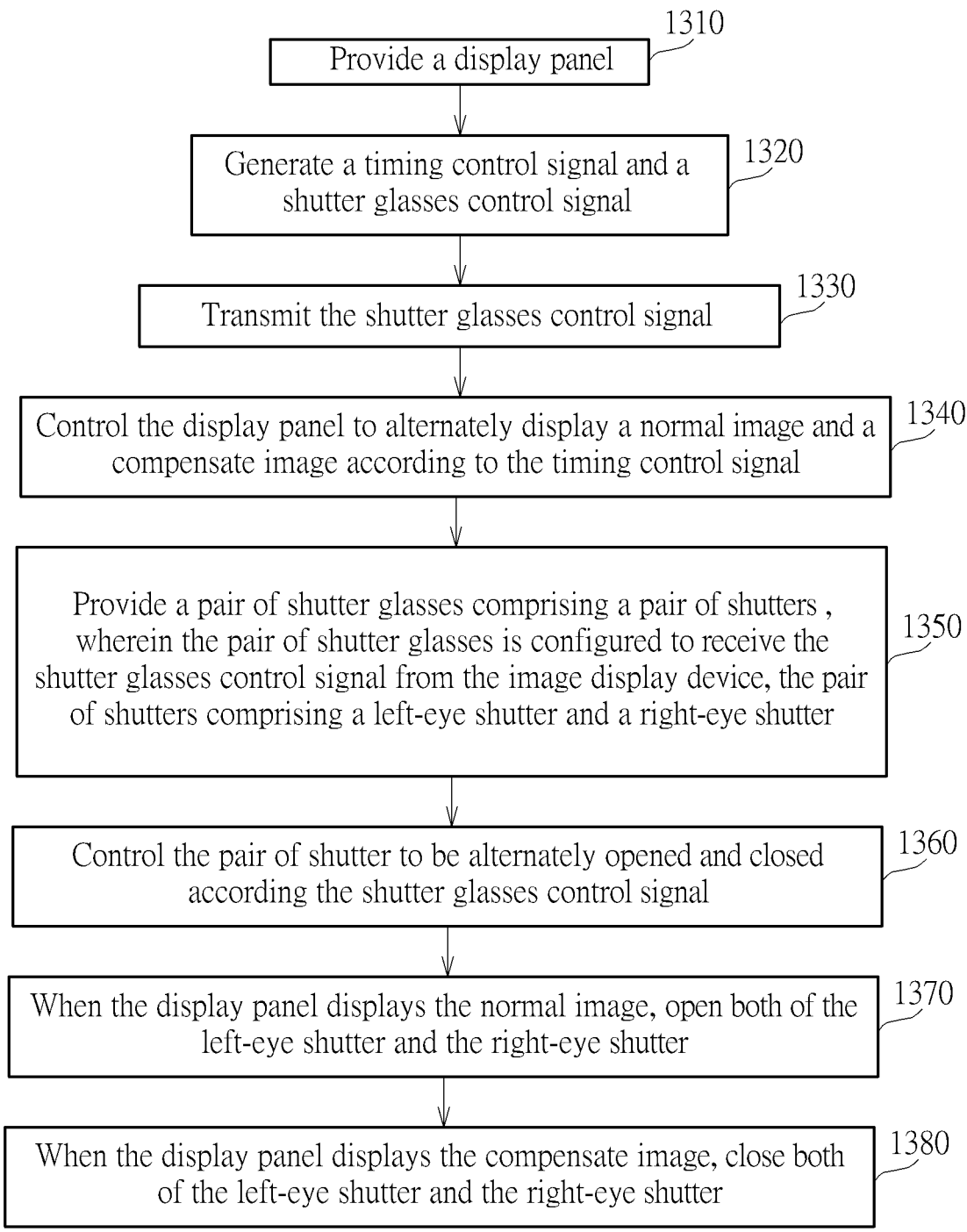

FIG. 13 is a flowchart showing a method applicable to the display system of the present invention.

DETAILED DESCRIPTION

Figure 1:
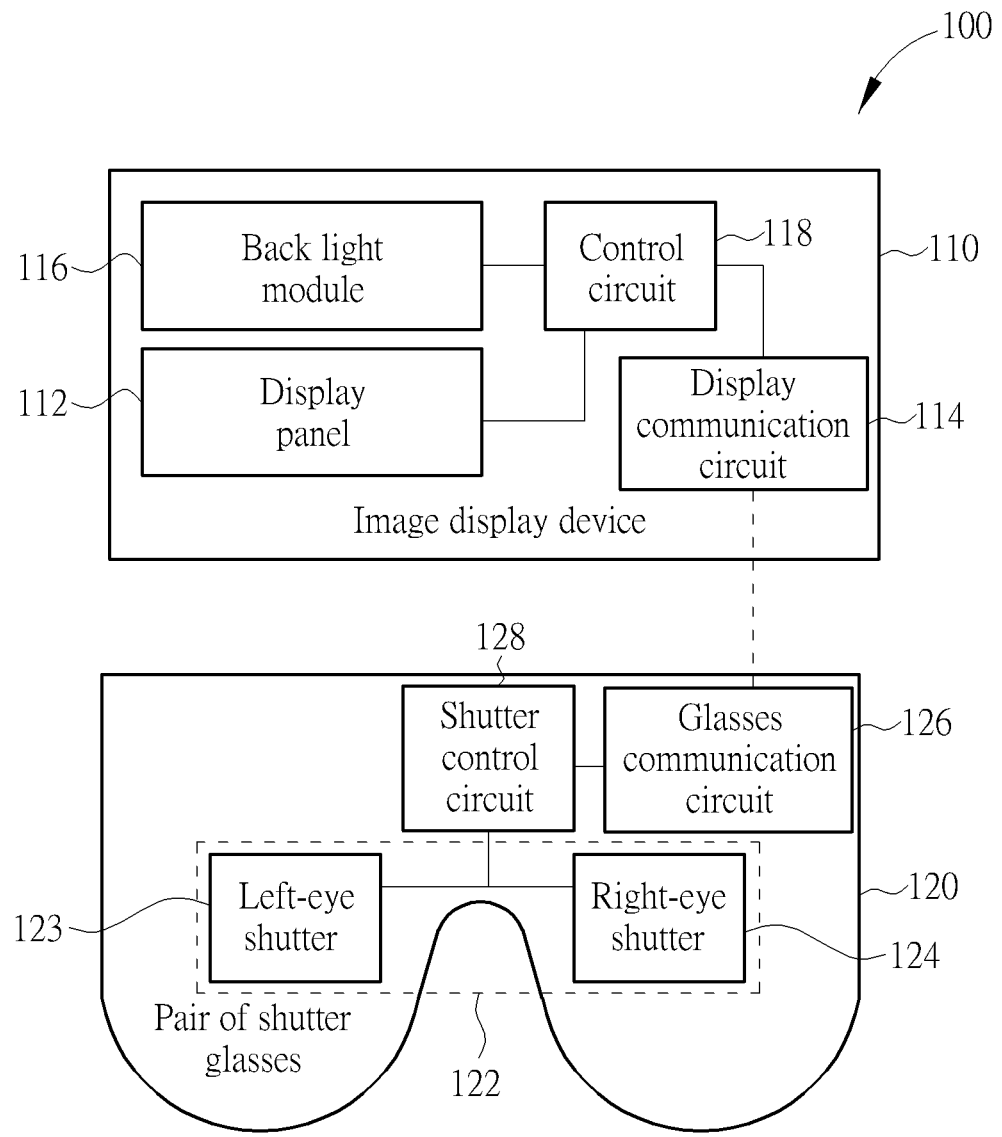
FIG. 1 is a diagram of a display system comprising an image display device and a pair of shutter glasses according to a first embodiment of the present invention.

Please refer to FIG. 1. FIG. 1 is a diagram of a display system 100 comprising an image display device 110 and a pair of shutter glasses 120 according to a first embodiment of the present invention. As shown in FIG. 1, the image display device 110 of the first embodiment comprises a display panel 112, a display communication circuit 114, aback light module 116 and a control circuit 118. The control circuit 118 is coupled to the back light module 116, the display panel 112 and the display communication circuit 114. In the present embodiment, the back light module 116 is a circuit configured to generate back light for the display panel 112. The control circuit 118 is configured to generate a timing control signal for controlling the back light module 116 and the display panel 112, and to generate a shutter glasses control (SGC) signal for synchronization with the pair of shutter glasses 120. The control circuit 118 is further configured to control the display communication circuit 114 to transmit the SGC signal, and further configured to control the display panel 112 to alternately display a normal image and a compensate image according to the timing control signal. For example, the timing control signal comprises a polarization (POL) signal sent to the display panel 112 (e.g., a driver of the display panel 112) to control the polarity of the display panel 112. The pair of shutter glasses 120 comprises a pair of shutters 122, a glasses communication circuit 126 and a shutter control circuit 128. The pair of shutters 122 comprises a left-eye shutter 123 and a right-eye shutter 124. The glasses communication circuit 126 is configured to receive the SGC signal generated from the display communication circuit 114 of the image display device 100. The shutter control circuit 128 is configured to alternately open and close the pair of shutters 122 according to the SGC signal. Specifically, when the display panel 112 displays the normal image, the shutter control circuit 128 opens both of the left-eye shutter 123 and the right-eye shutter 124; and when the display panel 112 displays the compensate image, the shutter control circuit 128 closes both of the left-eye shutter 123 and the right-eye shutter 124.

Figure 2:
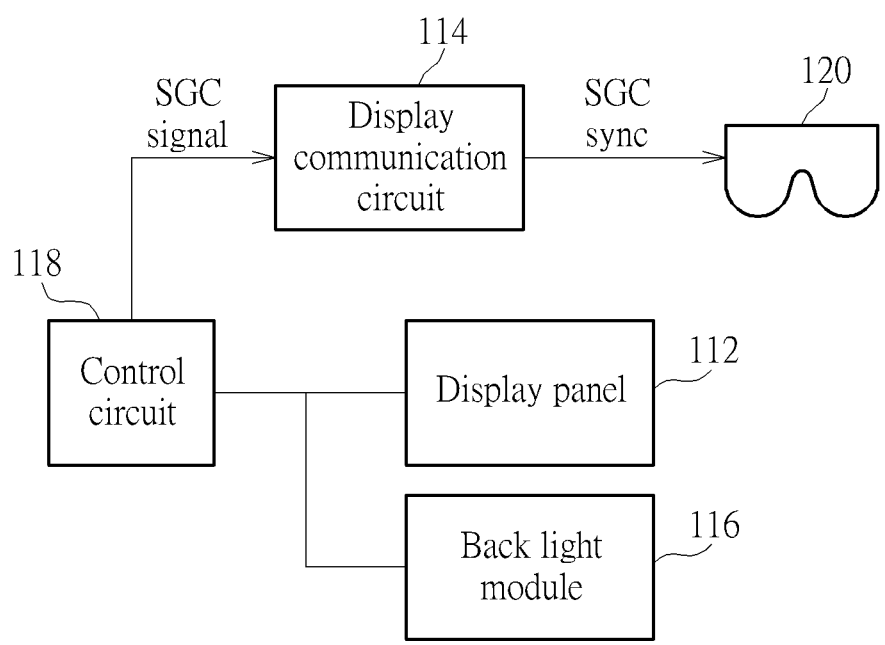
FIG. 2 is a diagram illustrating a SGC signal and a control signal generated from a control circuit and a shutter glasses control (SGC) sync signal generated from the display communication circuit according to the first embodiment of the present invention.

Please refer to FIG. 2. FIG. 2 is a diagram illustrating the SGC signal and a control signal generated from the control circuit 118 and a SGC sync signal generated from the display communication circuit 114 according to the first embodiment of the present invention. As shown in FIG. 2, the control circuit 118 generates the control signal to the display panel 112 and the back light module 116, in order to control the display panel 112 and the back light module 116. For example, the control circuit 118 transmits 24 pairs of transmission (TX) data (such as 0-23 lane TX bus data) and inverse data to the display panel 112, and transmits a Pulse-width modulation (PWM) signal to the back light module 116. The PMW signal is synchronized with the display panel 112. In other words, the control signal comprises the timing control signal for the display panel 112 and back light module 116. The control circuit 118 further generates the SGC signal to the display communication circuit 114. The display communication circuit 114 is configured to generate a SGC synchronization signal (labeled as "SGC sync" in FIG. 2 for brevity) from the SGC signal. For example, the control circuit 118 transmits the SGC signal having a frequency the same as that of a start vertical (STV) signal to the display communication circuit 114, and then the display communication circuit 114 modulates the SGC signal with a carrier wave (e.g. a 38 K Hertz wave) to generate the SGC synchronization signal. The display communication circuit 114 is further configured to transmit the SGC synchronization signal to the pair of shutter glasses 120. The glasses communication circuit 126 receives and demodulates the SGC synchronization signal to the SGC signal (e.g. a 60 Hertz SGC signal). The shutter control circuit 128 that controls the pair of shutters 122 according to the SGC signal is known to those skilled in the art, further description is omitted here for simplicity.

Figure 3:
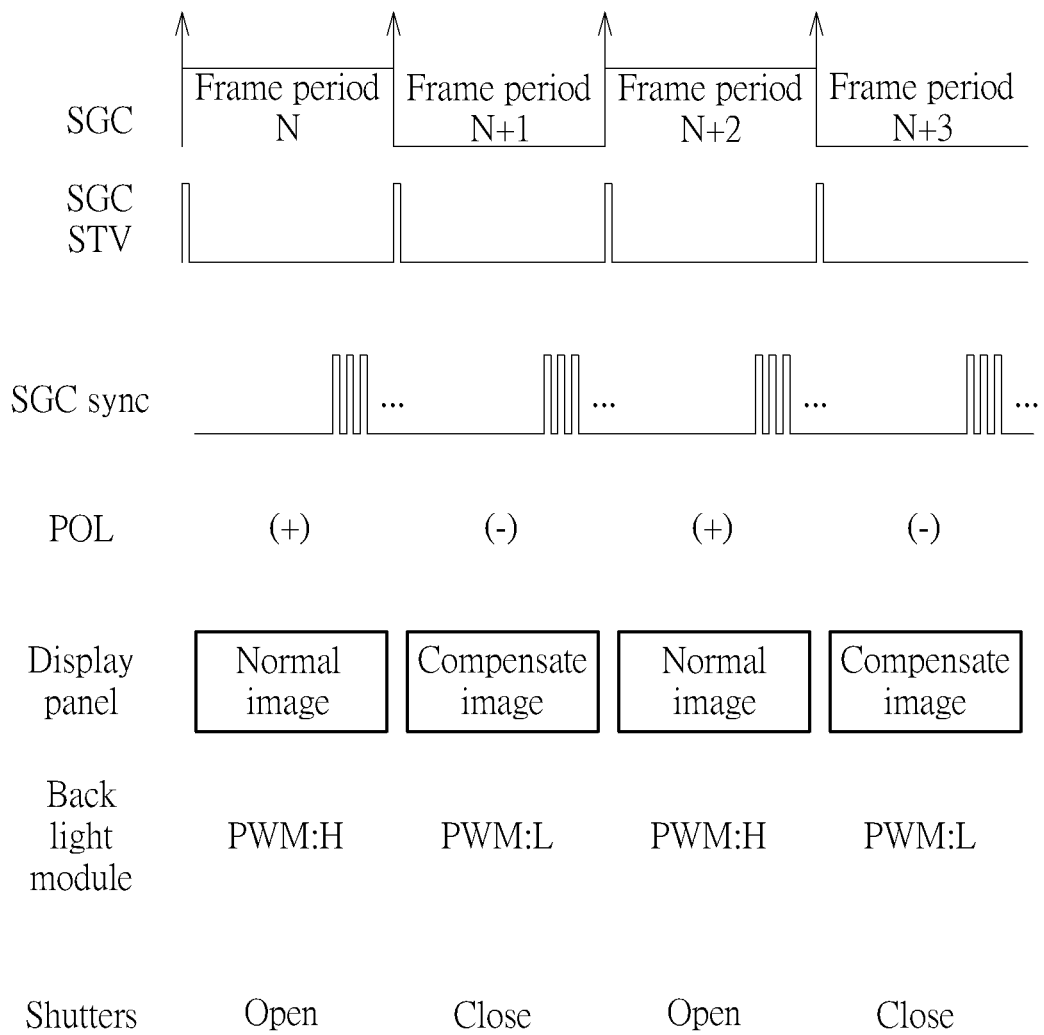
FIG. 3 is a diagram illustrating states of signals, a display panel and a back light module in a cycle with 4 frame periods of the SGC signal according the first embodiment of the present invention.

Please refer to FIG. 3. FIG. 3 is a diagram illustrating states of signals, the display panel 112, the pair of shutters 122 and the back light module 116 in a cycle with 4 frame periods of the SGC signal according the first embodiment of the present invention. As shown in FIG. 3, in the present embodiment, one cycle of the SGC signal may have 4 consecutive frame periods comprising a frame period N, a frame period N+1, a frame period N+2 and a frame period N+3, and the timing control signal is the same as the SGC signal. The STV signal generated from the control circuit 118 has the same frequency that the SGC signal has. The SGC synchronization signal is generated by modulating the SGC signal with a carrier wave. The polarity of the display panel 112 controlled by the POL signal (labeled "POL" in FIG. 3 for brevity) has to be switched alternately to prevent polarization error of the display panel 112, such as positive (+), positive (+), negative (−) and negative (−) in the 4 frame periods. The control circuit 118 controls the display panel 112 to display a plurality of normal images at the frame period N and the frame period N+2, respectively. The control circuit 118 further controls the display panel 112 to display a plurality of compensate images at the frame period N+1 and the frame period N+3, respectively. By way of example, but not limitation, a compensate image may be paired with a normal image, and may be set by a complementary image derived from the normal image. Furthermore, the control circuit 118 controls a PWM duty cycle of the back light module 116 to determine brightness of the back light module 116 according to the timing control signal. Specifically, when the display panel 112 displays the normal image, the control circuit 118 controls a duty cycle of the back light module 116 being at a first level; when the display panel 112 displays the compensate image, the control circuit controls a duty cycle of the back light module 116 being at a second level different from (e.g., lower than) the first level. In other words, the control circuit 118 controls a duty cycle of the back light module 116 being at a first level at the frame period N+1 and the frame period N+3, and controls a duty cycle of the back light module 116 being at a second level at the frame period N+1 and the frame period N+3. The first level is greater than the second level, such that the brightness of the back light module 116 with the first level duty cycle is brighter than the brightness of the back light module 116 with the second level duty cycle. The shutter control circuit 128 is configured to alternately open and close the pair of shutters 122 according to the SGC signal. Specifically, the control circuit 128 opens both of the left-eye shutter 123 and the right-eye shutter 124 at the frame period N and the frame period N+2, and closes both of the left-eye shutter 123 and the right-eye shutter 124 at the frame period N+1 and the frame period N+3.

According to above arrangement, the display panel 112 of the image display device 110 may alternately display the normal image and the compensate image according to the SGC signal. A user wearing the pair of shutter glasses 120 may see the normal image through the opened shutters 122, and do not see the compensate image (e.g. complementary image) due to being blocked by the closed shutters 122. A person who does not wear the pair of shutter glasses 120 sees only grayscale images which are generated by mixing a plurality of normal images and a plurality of compensate images. The display system 100 may prevent the screen (or the normal image) from being peeped by every person who does not wear the pair of shutter glasses 120 from any angle.

Figure 4:
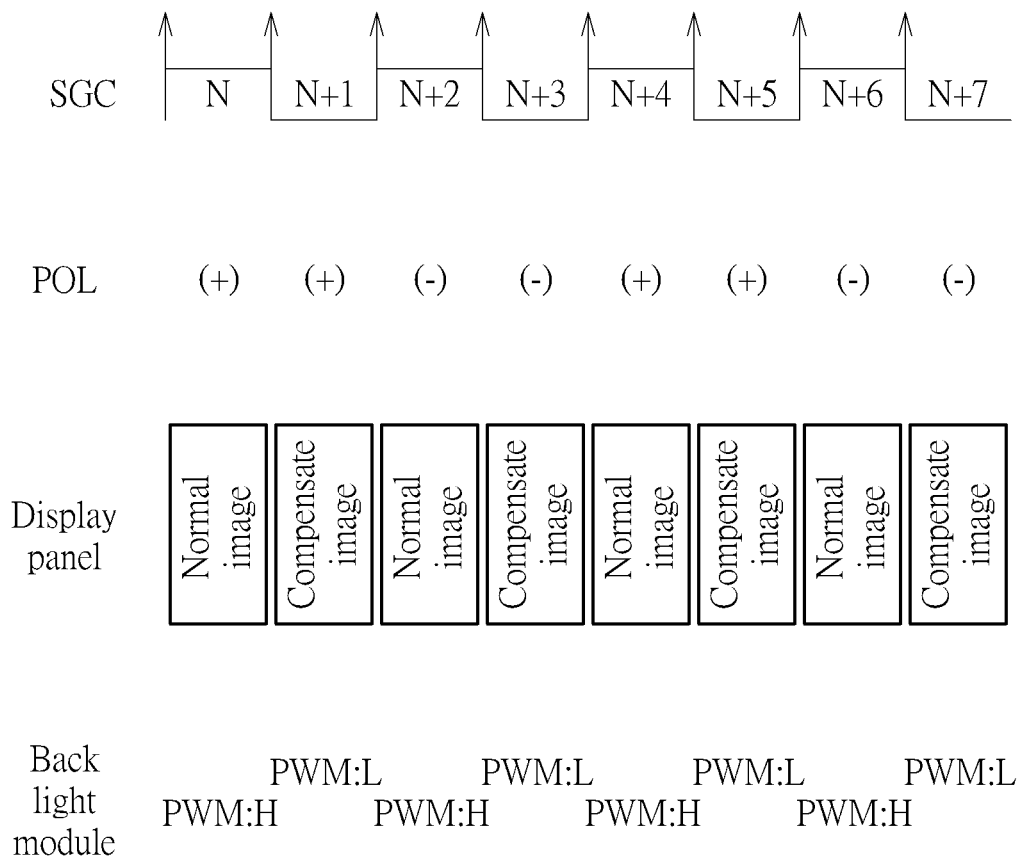
FIG. 4 is a diagram illustrating states of signals, the display panel and the back light module in a cycle with 8 frame periods of the SGC signal according the first embodiment of the present invention.
Figure 5:
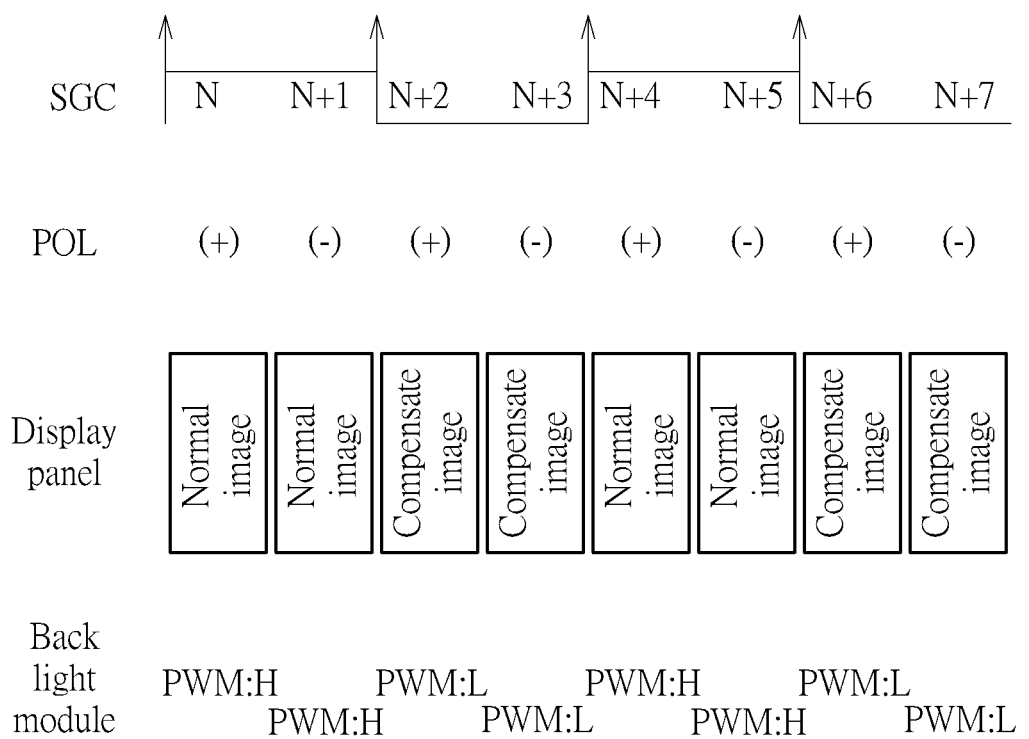
FIG. 5 is a diagram illustrating states of signals, the display panel and the back light module in a cycle with 8 frame periods of the SGC signal according the first embodiment of the present invention.
Figure 6:
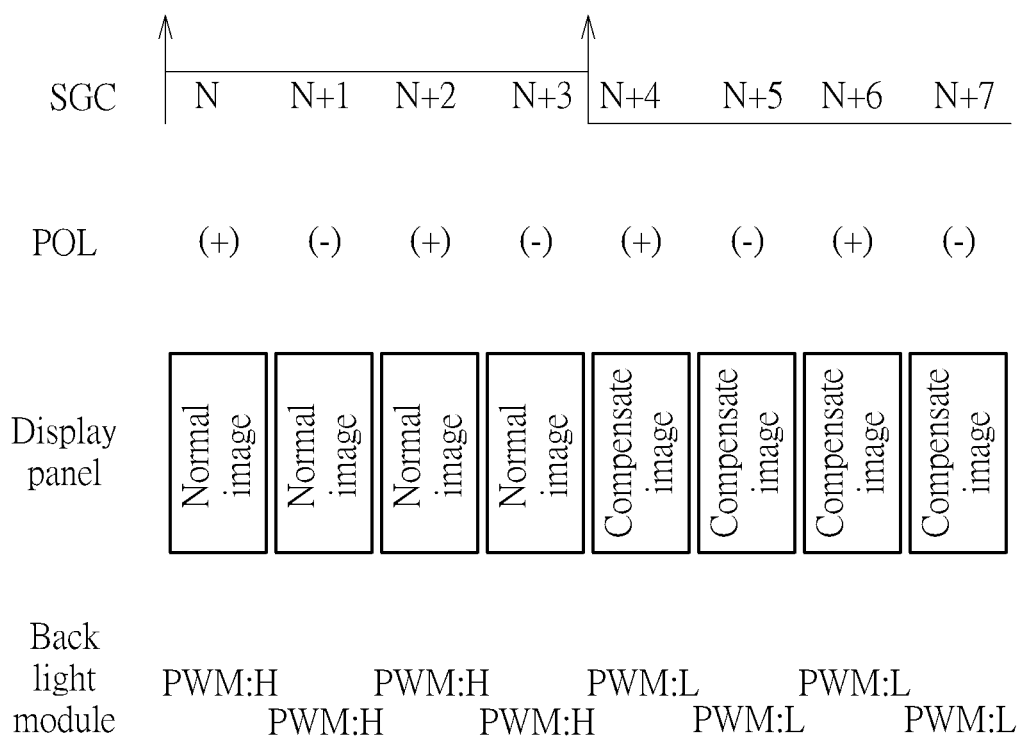
FIG. 6 is a diagram illustrating states of signals, the display panel and the back light module in a cycle with 8 frame period of the SGC signal according the first embodiment of the present invention.

In the present embodiment, one cycle of the timing control signal has 4 consecutive frame periods, but the present invention is not limited thereto. For example, please refer to FIG. 4 in conjunction with the diagrams shown in FIG. 5 and FIG. 6. FIG. 4, FIG. 5 and FIG. 6 are diagrams illustrating states of signals, the display panel 112 and the back light module 116 in a cycle with 8 frame periods of the SGC signal according the first embodiment of the present invention.

As shown in FIG. 4, one cycle of the timing control signal may have 8 consecutive frame periods comprising a frame period N, a frame period N+1, a frame period N+2, a frame period N+3, a frame period N+4, a frame period N+5, a frame period N+6 and a frame period N+7 (labeled as "N", "N+1", "N+7" in FIGS. 4-6 for brevity). The polarity of the display panel 112 controlled by the POL signal (labeled "POL" in FIG. 4 for brevity) has to be switched alternately to prevent error polarization of the display panel 112, such as positive (+), positive (+), negative (−), negative (−), positive (+), positive (+), negative (−) and negative (−) at the 8 frame periods. The control circuit 118 controls the display panel 112 to display a plurality of normal images at the frame period N, the frame period N+2, the frame period N+4 and the period frame N+6, respectively, and controls the display panel 112 to display a plurality of the compensate images at the frame period N+1, the frame period N+3, the frame period N+5 and the period frame N+7, respectively. By way of example, but not limitation, a compensate image may be paired with a normal image, and may be set by a complementary image derived from the normal image. Similarly, when the display panel 112 displays the normal image, the control circuit 118 controls a duty cycle of the back light module 116 being at a higher level (labeled as "H" in FIGS. 4-6 for brevity); when the display panel 112 displays the compensate image, the control circuit controls a duty cycle of the back light module 116 being at a lower level (labeled as "L" in FIGS. 4-6 for brevity).

As shown in FIG. 5, the control circuit 118 controls the display panel 112 to display a plurality of normal images at the frame period N, the frame period N+1, the frame period N+4 and the period frame N+5, respectively, and controls the display panel 112 to display a plurality of the compensate images at the frame period N+2, the frame period N+3, the frame period N+6 and the period frame N+7, respectively. By way of example, but not limitation, a compensate image may be paired with a normal image, and may be set by a complementary image derived from the normal image. The polarity of the display panel 112 controlled by the POL signal (labeled "POL" in FIG. 5 for brevity) has to be switched alternately to prevent polarization error of the display panel 112, such as positive (+), negative (−), positive (+), negative (−), positive (+), negative (−), positive (+) and negative (−) at the 8 frame periods.

As shown in FIG. 6, the control circuit 118 controls the display panel 112 to display a plurality of normal images at the frame period N, the frame period N+1, the frame period N+2 and the period frame N+3, respectively, and controls the display panel 112 to display a plurality of the compensate images at the frame period N+4, the frame period N+5, the frame period N+6 and the period frame N+7, respectively. By way of example, but not limitation, a compensate image may be paired with a normal image, and may be set by a complementary image derived from the normal image. The polarity of the display panel 112 controlled by the POL signal (labeled "POL" in FIG. 6 for brevity) has to be switched alternately to prevent polarization error of the display panel 112, such as positive (+), negative (−), positive (+), negative (−), positive (+), negative (−), positive (+) and negative (−) at the 8 frame periods. Similarly, when the display panel 112 displays the normal image, the control circuit 118 controls a duty cycle of the back light module 116 being at a higher level; when the display panel 112 displays the compensate image, the control circuit controls a duty cycle of the back light module 116 being at a lower level.

Figure 7:
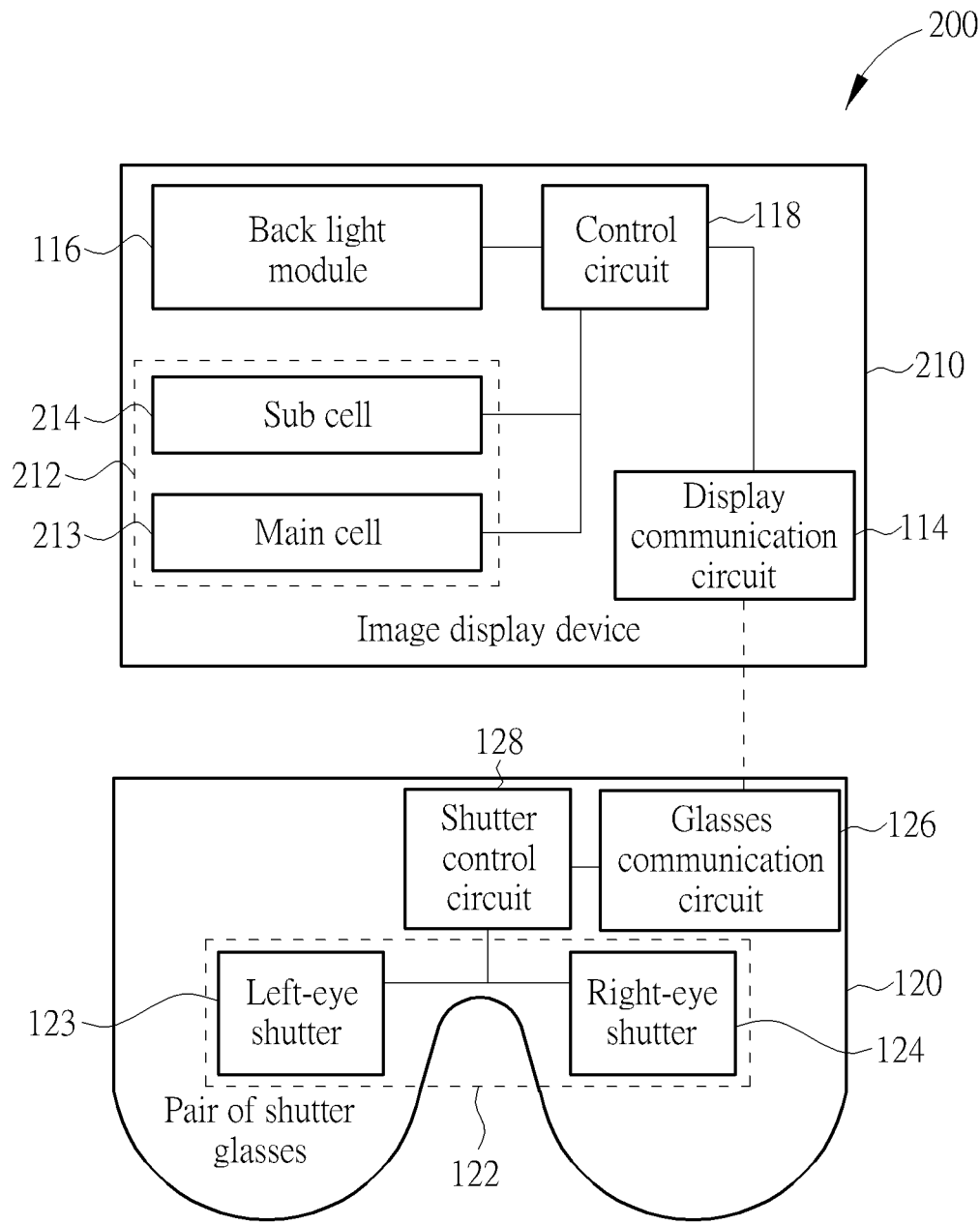
FIG. 7 is a diagram of a display system comprising an image display device and a pair of shutter glasses according to a second embodiment of the present invention.

Please refer to FIG. 7. FIG. 7 is a diagram of a display system 200 comprising an image display device 210 and a pair of shutter glasses 120 according to a second embodiment of the present invention. As shown in FIG. 7, the image display device 210 of the second embodiment comprises a display panel 212, a display communication circuit 114, a back light module 116 and a control circuit 118. The difference between the display panel 112 of the first embodiment and the display panel 212 of the second embodiment is that the display panel 212 comprises a main cell 213 and a sub cell 214. Similarly, the control circuit 118 is coupled to the back light module 116, the main cell 213, the sub cell 214 and the display communication circuit 114. In the present embodiment, the back light module 116 is a circuit configured to generate back light for the display panel 212. The control circuit 118 is configured to generate a timing control signal for controlling the back light module 116, the main cell 213 and the sub cell 214, and to generate a SGC signal for synchronization with the pair of shutter glasses 120. The control circuit 118 is configured to control the display communication circuit 114 to transmit the SGC signal, and further configured to control the main cell 213 to alternately display a normal image and a compensate image according to the timing control signal, and further configured to control the sub cell 214 to alternately display a first grayscale image and a second grayscale image. For example, the timing control signal comprises a polarization (POL) signal sent to the main cell 213 (e.g., a driver of the main cell 213) and the sub cell 214 (e.g., a driver of the sub cell 214) to control the polarity of the display panel 212. Specifically, when the main cell 213 displays the normal image, the control circuit 118 controls the sub cell 214 to display a first grayscale image; when the main cell 213 displays the compensate image, the control circuit controls the sub cell 214 to display a second grayscale image, where luminance of the first grayscale image is higher than luminance of the second grayscale image. For example, the first grayscale image may be a white image, and the second grayscale image may be a black image. The operations of the pair of shutter glasses 120 are similar to that of the first embodiment, such that further description is omitted here for simplicity. The shutter control circuit 128 is configured to alternately open and close the pair of shutters 122 according to the SGC signal. Specifically, when the main cell 213 of the display panel 212 displays the normal image, the shutter control circuit 128 opens both of the left-eye shutter 123 and the right-eye shutter 124; and when the main cell 213 of the display panel 212 displays the compensate image, the shutter control circuit 128 closes both of the left-eye shutter 123 and the right-eye shutter 124.

Figure 8:
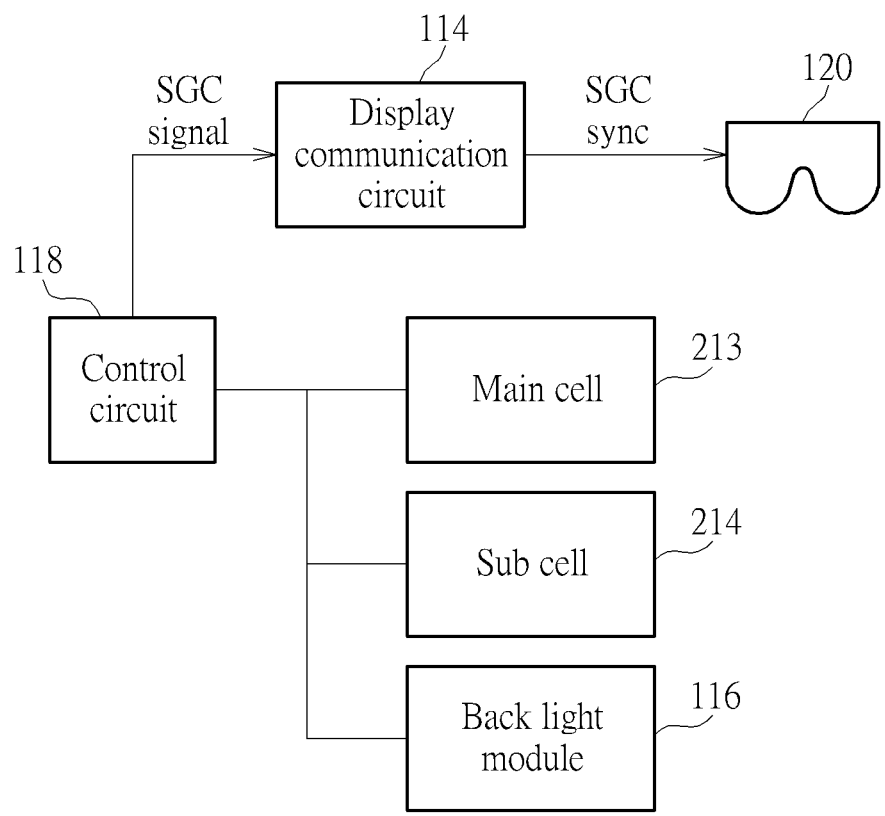
FIG. 8 is a diagram illustrating a SGC signal and a control signal generated from a control circuit and a shutter glasses control (SGC) sync signal generated from the display communication circuit according to the second embodiment of the present invention.

Please refer to FIG. 8. FIG. 8 is a diagram illustrating the SGC signal and a control signal generated from the control circuit 118 and a SGC sync signal generated from the display communication circuit 114 according to the second embodiment of the present invention. As shown in FIG. 8, the control circuit 118 generates the control signal to the main cell 213, the sub cell 214 and the back light module 116, in order to control the main cell 213, the sub cell 214 and the back light module 116. For example, the control circuit 118 transmits 24 pairs of transmission (TX) data (such as 0-23 lane TX bus data) to the main cell 213, another 24 pairs of TX data (such as 24-47 lane TX bus) to the sub cell 214 and a Pulse-width modulation (PWM) signal to the back light module 116. The display communication circuit 114 is configured to generate a SGC synchronization signal (labeled as "SGC sync" in FIG. 8 for brevity) from the SGC signal. The display communication circuit 114 is further configured to transmit the SGC synchronization signal to the pair of shutter glasses 120. The operations of the pair of shutter glasses 120 are similar to that of the first embodiment, such that further description is omitted here for simplicity.

Figure 9:
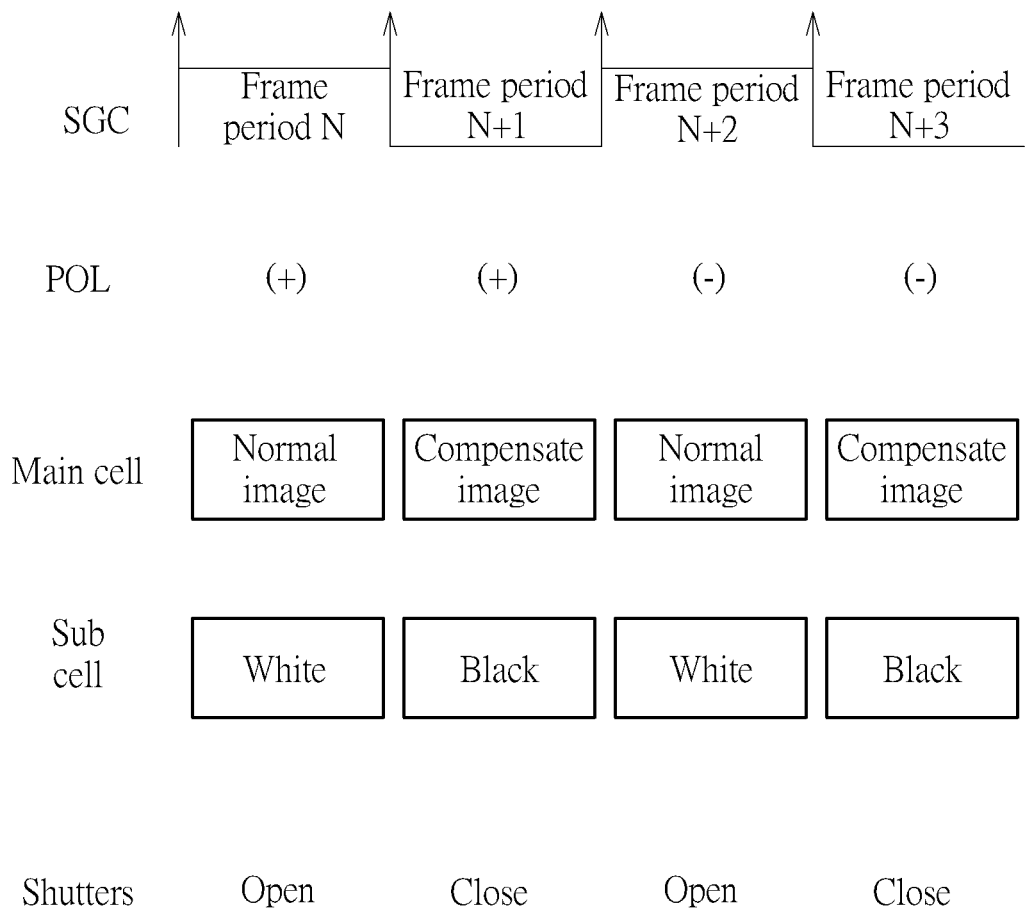
FIG. 9 is a diagram illustrating states of signals, a display panel and a back light module in a cycle with 4 frame periods of the SGC signal according the second embodiment of the present invention.

Please refer to FIG. 9. FIG. 9 is a diagram illustrating states of signals, the display panel 212, the pair of shutters 122 and the back light module 116 in a cycle with 4 frame periods of the SGC signal according the second embodiment of the present invention. As shown in FIG. 9, in the present embodiment, one cycle of the SGC signal may have 4 consecutive frame periods comprising a frame period N, a frame period N+1, a frame period N+2 and a frame period N+3, and the timing control signal is same as the SGC signal. The STV signal and the SGC synchronization signal are omitted in FIG. 9 for brevity. The polarity of the display panel 212 controlled by the POL signal (labeled "POL" in FIG. 9 for brevity) has to be switched alternately to prevent polarization error of the display panel 212, such as positive (+), positive (+), negative (−) and negative (−) in the 4 frame periods. The control circuit 118 controls the main cell 213 to display a plurality of normal images at the frame period N and the frame period N+2, respectively, and controls the sub cell 214 to display the first grayscale image at each of the frame period N and the frame period N+2. The control circuit 118 further controls the main cell 213 to display a plurality of compensate images at the frame period N+1 and the frame period N+3, respectively, and controls the sub cell 214 to display the second grayscale image at each of the frame period N+1 and the frame period N+3. By way of example, but not limitation, a compensate image may be paired with a normal image, and may be set by a complementary image derived from the normal image. Luminance of the first grayscale image is higher than luminance of the second grayscale image. For example, the first grayscale image is close to or identical to a white image, and the second grayscale image is close to or identical to a black image. Therefore, the states of the sub cell 214 are labeled as "White" and "Black" in FIG. 9 for brevity. The shutter control circuit 128 is configured to alternately open and close the pair of shutters 122 according to the SGC signal. Specifically, the control circuit 128 opens both of the left-eye shutter 123 and the right-eye shutter 124 at the frame period N and the frame period N+2, and closes both of the left-eye shutter 123 and the right-eye shutter 124 at the frame period N+1 and the frame period N+3.

Figure 10:
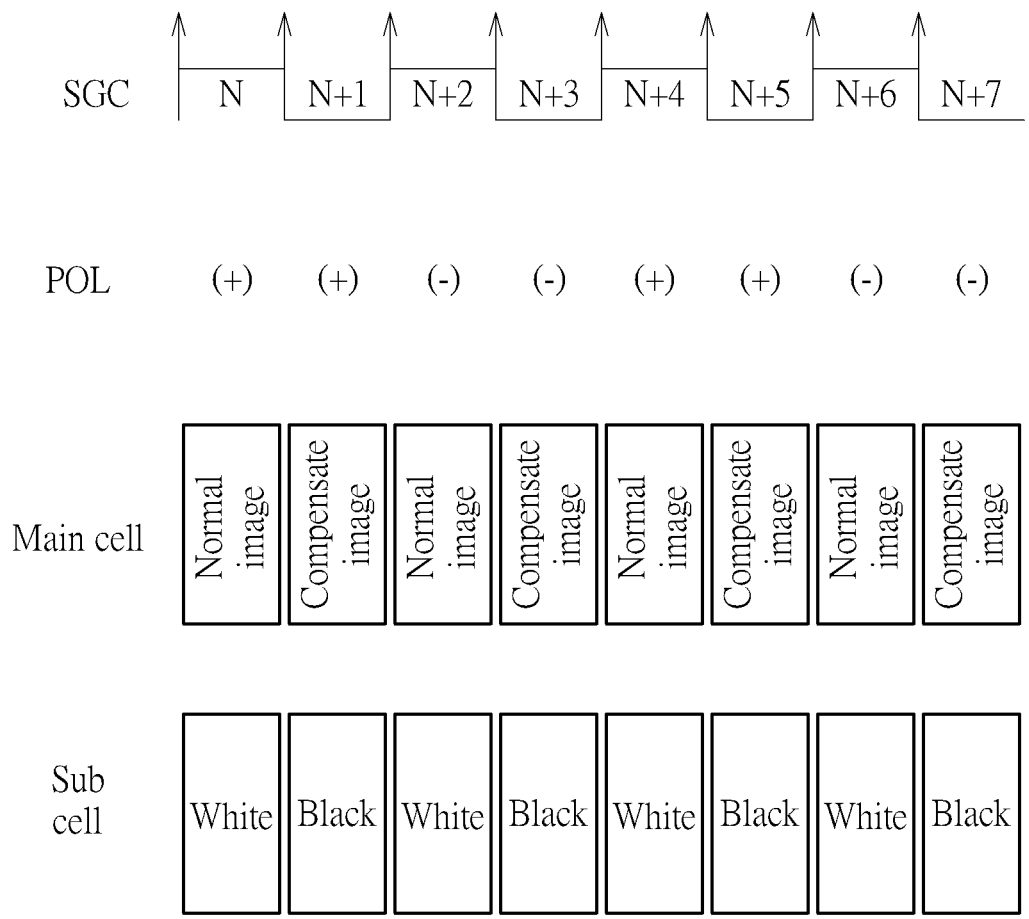
FIG. 10 is a diagram illustrating states of signals, the display panel and the back light module in a cycle with 8 frame periods of the SGC signal according the second embodiment of the present invention.
Figure 11:
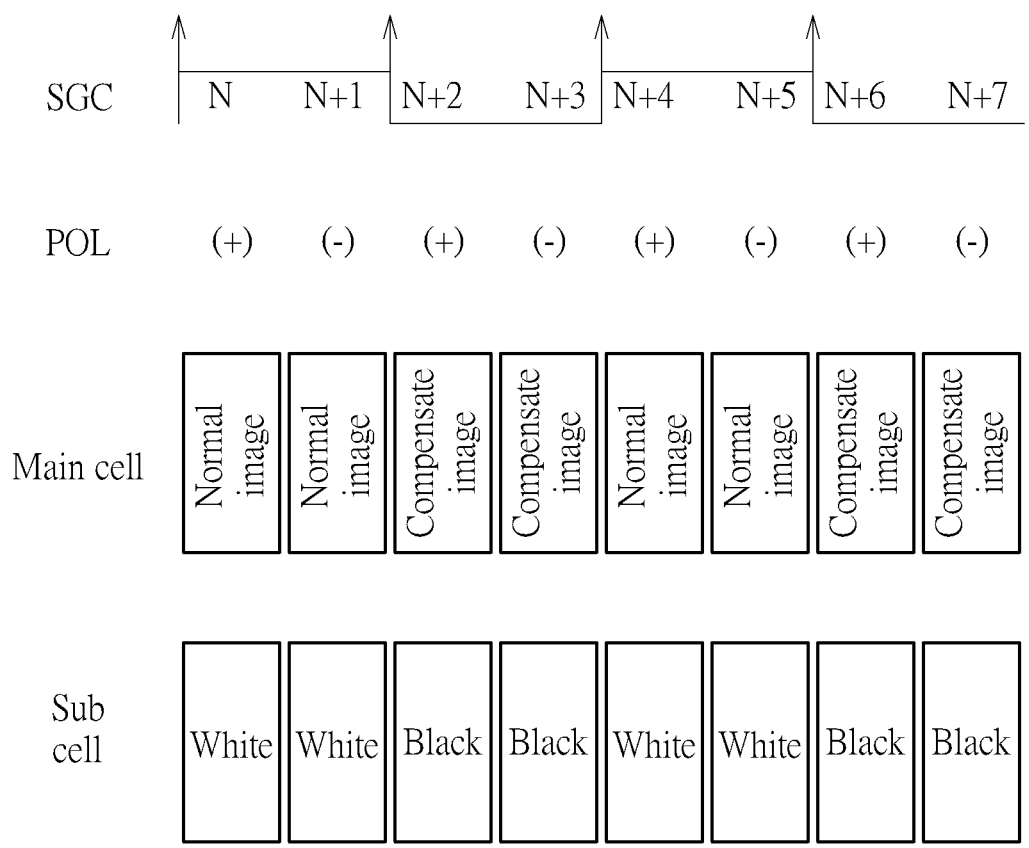
FIG. 11 is a diagram illustrating states of signals, the display panel and the back light module in a cycle with 8 frame periods of the SGC signal according the second embodiment of the present invention.

Please refer to FIG. 10 in conjunction with the diagrams shown in FIG. 11 and FIG. 12. FIG. 10, FIG. 11 and FIG. 12 are diagrams illustrating states of signals, the main cell 213 and the sub cell 214 in a cycle with 8 frame periods of the SGC signal according the second embodiment of the present invention.

As shown in FIG. 10, one cycle of the timing control signal may have 8 consecutive frame periods comprising a frame period N, a frame period N+1, a frame period N+2, a frame period N+3, a frame period N+4, a frame period N+5, a frame period N+6 and a frame period N+7 (labeled as "N", "N+1", "N+7" in FIGS. 10-12 for brevity). The polarity of the display panel 212 controlled by the POL signal (labeled "POL" in FIG. 10 for brevity) has to be switched alternately to prevent error polarization of the display panel 212, such as positive (+), positive (+), negative (−), negative (−), positive (+), positive (+), negative (−) and negative (−) at the 8 frame periods. The control circuit 118 controls the main cell 213 to display a plurality of normal images at the frame period N, the frame period N+2, the frame period N+4 and the period frame N+6, respectively, and controls the main cell 213 to display a plurality of the compensate images at the frame period N+1, the frame period N+3, the frame period N+5 and the period frame N+7, respectively. By way of example, but not limitation, a compensate image may be paired with a normal image, and may be set by a complementary image derived from the normal image. Similarly, when the main cell 213 displays the normal image, the control circuit 118 controls the sub cell 214 to display the first grayscale image (labeled as "White" in FIGS. 10-12 for brevity); when the main cell 213 displays the compensate image, the control circuit controls the sub cell 214 to display the second grayscale image (labeled as "Black" in FIGS. 10-12 for brevity).

As shown in FIG. 11, the control circuit 118 controls main cell 213 to display a plurality of normal images at the frame period N, the frame period N+1, the frame period N+4 and the period frame N+5, respectively, and controls the main cell 213 to display a plurality of the compensate images at the frame period N+2, the frame period N+3, the frame period N+6 and the period frame N+7, respectively. Byway of example, but not limitation, a compensate image may be paired with a normal image, and may be set by a complementary image derived from the normal image. The polarity of the display panel 212 controlled by the POL signal (labeled "POL" in FIG. 11 for brevity) has to be switched alternately to prevent polarization error of the display panel 212, such as positive (+), negative (−), positive (+), negative (−), positive (+), negative (−), positive (+) and negative (−) at the 8 frame periods.

As shown in FIG. 12, the control circuit 118 controls the main cell 213 to display a plurality of normal images at the frame period N, the frame period N+1, the frame period N+2 and the period frame N+3, respectively, and controls the main cell 213 to display a plurality of the compensate images at the frame period N+4, the frame period N+5, the frame period N+6 and the period frame N+7, respectively. Byway of example, but not limitation, a compensate image may be paired with a normal image, and may be set by a complementary image derived from the normal image. The polarity of the display panel 212 controlled by the POL signal (labeled "POL" in FIG. 12 for brevity) has to be switched alternately to prevent polarization error of the display panel 212, such as positive (+), negative (−), positive (+), negative (−), positive (+), negative (−), positive (+) and negative (−) at the 8 frame periods. Similarly, when the main cell 213 displays the normal image, the control circuit 118 controls the sub cell 214 to display the first grayscale image; when the main cell 213 displays the compensate image, the control circuit controls the sub cell 214 to display the second grayscale image.

Refer to FIG. 13, which is a flowchart 1300 showing a method applicable to the display systems 100, 200 of the present invention. The method applicable to the display system of the present invention comprises the following steps:

Step 1310: Provide a display panel;

Step 1320: Generate a timing control signal and a shutter glasses control signal;

Step 1330: Transmit the shutter glasses control signal;

Step 1340: Control the display panel to alternately display a normal image and a compensate image according to the timing control signal;

Step 1350: Provide a pair of shutter glasses comprising a pair of shutters, wherein the pair of shutter glasses is configured to receive the shutter glasses control signal from the image display device, the pair of shutters comprising a left-eye shutter and a right-eye shutter;

Step 1360: Control the pair of shutter to be alternately opened and closed according the shutter glasses control signal;

Step 1370: When the display panel displays the normal image, open both of the left-eye shutter and the right-eye shutter; and Step 1380: When the display panel displays the compensate image, close both of the left-eye shutter and the right-eye shutter.

Since a person skilled in the pertinent art can readily understand details of the steps after reading above paragraphs directed to the display systems 100, 200, further description is omitted here for brevity.

In contrast to the prior art, the present invention method and display system can control a display panel to alternately display a normal image and a compensate image according to a timing control signal. Through a pair of shutters of a pair of shutter glasses being opened and closed, only a user who wears the pair of shutter glasses may see the normal image, which prevents the personal data on the screen from being peeped at any angle and therefore achieves anti-peep mechanism. A person who does not wear the pair of shutter glasses 120 sees only a grayscale image which is generated by mixing a plurality of normal images and a plurality of compensate images. The display system 100 may prevent the screen (or the normal images) from being peeped at any angle by any person who does not wear the pair of shutter glasses 120.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display system, comprising:
   an image display device, comprising:
      a display panel;
      a display communication circuit; and
      a control circuit, coupled to the display panel and the display communication circuit, wherein the control circuit is configured to generate a timing control signal and a shutter glasses control signal, configured to control the display communication circuit to transmit the shutter glasses control signal, and configured to control the display panel to alternately display a normal image and a compensate image according to the timing control signal; and
   a pair of shutter glasses, comprising:
      a pair of shutters, comprising a left-eye shutter and a right-eye shutter;
      a glasses communication circuit, configured to receive the shutter glasses control signal from the image display device; and
      a shutter control circuit, configured to alternately open and close the pair of shutters according to the shutter glasses control signal, wherein when the display panel displays the normal image, the shutter control circuit opens both of the left-eye shutter and the right-eye shutter; when the display panel displays the compensate image, the shutter control circuit closes both of the left-eye shutter and the right-eye shutter.

2. The display system of claim 1, wherein the image display device further comprises:
   a back light module, configured to generate back light for the display panel;
   the control circuit controls the back light module according to the timing control signal; when the display panel displays the normal image, the control circuit controls a duty cycle of the backlight module being at a first level; when the display panel displays the compensate image, the control circuit controls a duty cycle of the back light module being at a second level, wherein the first level is greater than the second level.

3. The display system of claim 2, wherein one cycle of the timing control signal has 4 consecutive frame periods comprising a frame period N, a frame period N+1, a frame period N+2 and a frame period N+3, and the timing control signal comprises a polarization signal sent to the display panel to control a polarity of the display panel.

4. The display system of claim 3, wherein the control circuit controls the display panel to display a plurality of normal images at the frame period N and the frame period N+2, respectively, and controls the display panel to display a plurality of compensate images at the frame period N+1 and the frame period N+3, respectively.

5. The display system of claim 2, wherein one cycle of the timing control signal has 8 consecutive frame periods comprising a frame period N, a frame period N+1, a frame period N+2, a frame period N+3, a frame period N+4, a frame period N+5, a frame period N+6 and a frame period N+7, and the timing control signal comprises a polarization signal sent to the display panel to control a polarity of the display panel.

6. The display system of claim 5, wherein the control circuit controls the display panel to display a plurality of normal images at the frame period N, the frame period N+1, the frame period N+4 and the period frame N+5, respectively, and controls the display panel to display a plurality of the compensate images at the frame period N+2, the frame period N+3, the frame period N+6 and the period frame N+7, respectively.

7. The display system of claim 5, wherein the control circuit controls the display panel to display a plurality of normal images at the frame period N, the frame period N+1, the frame period N+2 and the frame period N+3, respectively, and controls the display panel to display a plurality of compensate images at the frame period N+4, the frame period N+5, the frame period N+6 and the frame period N+7, respectively.

8. The display system of claim 1, wherein the display panel comprises a main cell and a sub cell, the control circuit controls the main cell to alternately display the normal image and the compensate image according to the timing control signal; when the main cell displays the normal image, the control circuit controls the sub cell to display a first grayscale image; when the main cell displays the compensate image, the control circuit controls the sub cell to display a second grayscale image, wherein luminance of the first grayscale image is higher than luminance of the second grayscale image.

9. The display system of claim 8, wherein one cycle of the timing control signal has 4 consecutive frame periods comprising a frame period N, a frame period N+1, a frame period N+2 and a frame period N+3, and the timing control signal comprises a polarization signal sent to the display panel to control a polarity of the display panel.

10. The display system of claim 9, wherein the control circuit controls the main cell to display a plurality of normal images at the frame period N and the frame period N+2, respectively, controls the sub cell to display the first grayscale image at each of the frame period N and the frame period N+2, controls the main cell to display a plurality of compensate images at the frame period N+1 and the frame period N+3, respectively, and controls the sub cell to display the second grayscale image at each of the frame period N+1 and the frame period N+3.

11. The display system of claim 8, wherein one cycle of the timing control signal has 8 consecutive frame periods comprising a frame period N, a frame period N+1, a frame period N+2, a frame period N+3, a frame period N+4, a frame period N+5, a frame period N+6 and a frame period N+7, and the timing control signal comprises a polarization signal sent to the display panel to control a polarity of the display panel.

12. The display system of claim 11, wherein the control circuit controls the main cell to display a plurality of normal images at the frame period N, the frame period N+1, the frame period N+4 and the frame period N+5, respectively, controls the sub cell to display the first grayscale image at each of the frame period N, the frame period N+1, the frame period N+4 and the frame period N+5, controls the main cell to display a plurality of compensate images at the frame period N+2, the frame period N+3, the frame period N+6 and the frame period N+7, respectively, and controls the sub cell to display the second grayscale image at each of the frame period N+2, the frame period N+3, the frame period N+6 and the frame period N+7.

13. The display system of claim 11, wherein the control circuit controls the display panel to display a plurality of normal images at the frame period N, the frame period N+1, the frame period N+2 and the frame period N+3, respectively, controls the sub cell to display the first grayscale image at each of the frame period N, the frame period N+1, the frame period N+2 and the frame period N+3, controls the main cell to display a plurality of compensate images at the frame period N+4, the frame period N+5, the frame period N+6 and the frame period N+7, respectively, and controls the sub cell to display the second grayscale image at each of the frame period N+4, the frame period N+5, the frame period N+6 and the frame period N+7.

14. A display method, comprising:
generating a timing control signal and a shutter glasses control signal;
transmitting the shutter glasses control signal to a pair of shutter glasses, wherein the pair of shutter glasses comprises a pair of shutters, and is configured to receive the shutter glasses control signal, and the pair of shutters comprises a left-eye shutter and a right-eye shutter;
controlling a display panel to alternately display a normal image and a compensate image according to the timing control signal;
controlling the pair of shutters to be alternately opened and closed according the shutter glasses control signal, comprising:
when the display panel displays the normal image, opening both of the left-eye shutter and the right-eye shutter; and
when the display panel displays the compensate image, closing both of the left-eye shutter and the right-eye shutter.

15. The display method of claim 14, further comprising:
controlling a back light module to generate back light for the display panel according to the timing control signal, comprising:
when the display panel displays the normal image, controlling a duty cycle of the back light module being at a first level; and
when the display panel displays the compensate image, controlling a duty cycle of the back light module being at a second level, wherein the first level is greater than the second level.

16. The display method of claim 15, wherein one cycle of the timing control signal has 4 consecutive frame periods comprising a frame period N, a frame period N+1, a frame period N+2 and a frame period N+3, the timing control signal comprises a polarization signal sent to the display panel, and the step of controlling the display panel to alternately display the normal image and the compensate image according to the timing control signal comprises:
controlling a polarity of the display panel by the polarization signal;
controlling the display panel to display a plurality of normal images at the frame period N and the frame period N+2, respectively; and
controlling the display panel to display a plurality of compensate images at the frame period N+1 and the frame period N+3, respectively.

17. The display method of claim 15, wherein one cycle of the timing control signal has 8 consecutive frame periods comprising a frame period N, a frame period N+1, a frame period N+2, a frame period N+3, a frame period N+4, a frame period N+5, a frame period N+6 and a frame period N+7, the timing control signal comprises a polarization signal sent to the display panel, and the step of controlling the display panel to alternately display the normal image and the compensate image according to the timing control signal comprises:
controlling a polarity of the display panel by the polarization signal;
controlling the display panel to display a plurality of normal images at the frame period N, the frame period N+1, the frame period N+4 and the frame period N+5, respectively; and
controlling the display panel to display a plurality of compensate images at the frame period N+2, the frame period N+3, the frame period N+6 and the frame period N+7, respectively.

18. The display method of claim 14, wherein the display panel comprises a main cell and a sub cell, the step of controlling the display panel to alternately display the normal image and the compensate image according to the timing control signal comprises:
controlling the main cell to alternately display the normal image and the compensate image according to the timing control signal; and the display method further comprises:
when the main cell displays the normal image, controlling the sub cell to display a first grayscale image; and
when the main cell displays the compensate image, controlling the sub cell to display a second grayscale image, wherein luminance of the first grayscale image is higher than luminance of the second grayscale image.

19. The display method of claim 18, wherein one cycle of the timing control signal has 4 consecutive frame periods comprising a frame period N, a frame period N+1, a frame period N+2 and a frame period N+3, the timing control signal comprises a polarization signal sent to the display panel, and the step of controlling the display panel to alternately display the normal image and the compensate image according to the timing control signal comprises:
controlling a polarity of the display panel by the polarization signal;
controlling the main cell to display a plurality of normal images at the frame period N and the frame period N+2, respectively; and
controlling the main cell to display a plurality of compensate images at the frame period N+1 and the frame period N+3, respectively;
the step of controlling the sub cell to display the first grayscale image comprises:
controlling the sub cell to display the first grayscale image at the frame period N and the frame period N+2; and
the step of controlling the sub cell to display the second grayscale image comprises:
controlling the sub cell to display the second grayscale image at the frame period N+1 and the frame period N+3.

20. The display method of claim 18, wherein one cycle of the timing control signal has 8 consecutive frame periods comprising a frame period N, a frame period N+1, a frame period N+2, a frame period N+3, a frame period N+4, a frame period N+5, a frame period N+6 and a frame period N+7, the timing control signal comprises a polarization signal sent to the display panel, and the step of controlling the display panel to alternately display the normal image and the compensate image according to the timing control signal comprises:
controlling a polarity of the display panel by the polarization signal;
controlling the main cell to display a plurality of normal images at the frame period N, the frame period N+1, the frame period N+4 and the frame period N+5, respectively; and
controlling the main cell to display a plurality of compensate images at the frame period N+2, the frame period N+3, the frame period N+6 and the frame period N+7, respectively;
the step of controlling the sub cell to display the first grayscale image comprises:
controlling the sub cell to display the first grayscale image at the frame period N, the frame period N+1, the frame period N+4 and the frame period N+5; and
the step of controlling the sub cell to display the second grayscale image comprises:
controlling the sub cell to display the second grayscale image at the frame period N+2, the frame period N+3, the frame period N+6 and the frame period N+7.

* * * * *